United States Patent
Huang (10) Patent No.: US 11,838,381 B2
(45) Date of Patent: Dec. 5, 2023

(54) DEVICE CROSS-AREA ACCESS METHOD, ELECTRONIC DEVICE, AND NON-TRANSITORY COMPUTER-READABLE STORAGE MEDIUM

(71) Applicant: ZHEJIANG UNIVIEW TECHNOLOGIES CO., LTD., Binjiang District Hangzhou (CN)

(72) Inventor: Cheng Huang, Zhejiang (CN)

(73) Assignee: Zhejiang Uniview Technologies Co., Ltd., Zhejiang (CN)

( * ) Notice: Subject to any disclaimer, the term of this patent is extended or adjusted under 35 U.S.C. 154(b) by 0 days.

(21) Appl. No.: 18/024,714

(22) PCT Filed: Dec. 23, 2020

(86) PCT No.: PCT/CN2020/138734
§ 371 (c)(1),
(2) Date: Mar. 3, 2023

(87) PCT Pub. No.: WO2022/048069
PCT Pub. Date: Mar. 10, 2022

(65) Prior Publication Data
US 2023/0319157 A1    Oct. 5, 2023

(30) Foreign Application Priority Data
Sep. 3, 2020 (CN) .......................... 202010916688.3

(51) Int. Cl.
*H04L 29/06* (2006.01)
*H04L 67/562* (2022.01)
(Continued)

(52) U.S. Cl.
CPC .......... *H04L 67/562* (2022.05); *H04L 67/141* (2013.01)

(58) Field of Classification Search
CPC .......................... H04L 67/562; H04L 67/141
(Continued)

(56) References Cited

U.S. PATENT DOCUMENTS 9,924,340 B1 *   3/2018   Ren .................... H04W 4/24
10,333,789 B1 *  6/2019   Dippenaar ............. H04L 63/00
(Continued)

FOREIGN PATENT DOCUMENTS

CN    104158891 A    11/2014
CN    107360249 A    11/2017
(Continued)

OTHER PUBLICATIONS

International Search Report dated May 20, 2021 in International Application No. PCT/CN2020/138734, pp. 1-4.
(Continued)

*Primary Examiner* — Jude Jean Gilles
(74) *Attorney, Agent, or Firm* — Byrne Poh LLP (57) ABSTRACT

Provided are a device cross-region access method and apparatus, an electronic device, and a storage medium. The method includes: receiving a cross-region access request from a target device and determining IP address information in the cross-region access request; determining information of a cross-region proxy server matching the target device according to the IP address information, where the cross-region proxy server is preset in a proxy region different from a target region where the target server is located, and the cross-region proxy server and the target server are in a distributed deployment; and transmitting the information of the cross-region proxy server to the target device to enable the target device to establish a connection to the cross-region proxy server.

16 Claims, 5 Drawing Sheets

(51) Int. Cl.
*H04L 67/141* (2022.01)
*G06F 17/00* (2019.01)

(58) Field of Classification Search
USPC .......................................................... 709/227
See application file for complete search history.

(56) References Cited

U.S. PATENT DOCUMENTS

| | | | |
|---|---|---|---|
| 10,382,461 B1* | 8/2019 | Sharifi Mehr | H04L 63/1425 |
| 10,548,038 B2* | 1/2020 | Celik | H04W 24/10 |
| 2007/0153782 A1* | 7/2007 | Fletcher | H04L 43/00 |
| | | | 370/466 |
| 2009/0254971 A1* | 10/2009 | Herz | G06Q 30/0603 |
| | | | 726/1 |
| 2012/0136724 A1* | 5/2012 | McGuire | H04N 21/25883 |
| | | | 705/14.58 |
| 2014/0082140 A1 | 3/2014 | Toussaint et al. | |
| 2014/0195609 A1* | 7/2014 | Wise | H04L 12/185 |
| | | | 709/204 |
| 2014/0274135 A1* | 9/2014 | Edge | H04W 4/021 |
| | | | 455/456.2 |
| 2014/0274136 A1* | 9/2014 | Edge | H04W 4/024 |
| | | | 455/456.2 |
| 2020/0112639 A1 | 4/2020 | Ponomarev et al. | |

FOREIGN PATENT DOCUMENTS

| | | |
|---|---|---|
| CN | 109150677 A | 1/2019 |
| CN | 109327542 A | 2/2019 |
| CN | 110247944 A | 9/2019 |

OTHER PUBLICATIONS

Office Action dated Jul. 8, 2022 in CN Patent Application No. 202010916688.3, pp. 1-9.

* cited by examiner

DEVICE CROSS-AREA ACCESS METHOD, ELECTRONIC DEVICE, AND NON-TRANSITORY COMPUTER-READABLE STORAGE MEDIUM

CROSS-REFERENCE TO RELATED APPLICATIONS

This is a National Stage Application filed under 35 U.S.C. 371 based on International Patent Application No. PCT/CN2020/138734, filed on Dec. 23, 2020, which claims priority to Chinese Patent Application No. 202010916688.3 filed with the China National Intellectual Property Administration (CNIPA) on Sep. 3, 2020, the disclosures of each of which are hereby incorporated by reference herein in their entireties.

TECHNICAL FIELD

Embodiments of the present application relate to the field of the Internet of Things technologies, for example, a device cross-region access method, an electronic device, and a non-transitory computer-readable storage medium.

BACKGROUND

With the rapid development of the Internet of Things and the opening of the global market, electronic devices of the Internet of Things are sold overseas. In actual product sales, when the same devices are sold in different regions and countries, different price systems exist due to the factors such as the economic level, tariff policies, and profit distribution of multiple regions and countries. To avoid the market disorder caused by cross-region sales of the device (i.e., selling beyond agreed areas) during the actual sales process, the manufacturer adjusts cloud servers according to different sales regions for the same devices. Taking country A and country B as two regions as an example, when the same devices are sold in both country A and country B, each of country A and country B has a set of cloud servers established, databases in sets of cloud servers are independent, and parameters are set in the devices so that the devices sold to country A can only access the cloud servers that are in country A and the devices sold to country B can only access the cloud servers that are in country B. In this manner, the access path of a device is isolated, and the constrained and designated devices can only be sold to the designated region to avoid cross-region sales of the device.

However, in actual sales scenarios, customers in some regions take the initiative to inspect the devices at the manufacturer's location and randomly select devices for testing during the inspection, where the testing includes testing access to a device through a client. In this case, the client and device that match each other are connected to the cloud servers at abroad by default. Due to reasons such as delay or network limitation, the inaccessible probability is relatively high, affecting the test results.

The solution is to modify the tag information set on the device and bound with the accessed cloud servers to achieve the purpose of modifying an address parameter of the designated server. For example, the tag of the device of country B is modified to the tag of the device of country A, enabling the client and the device to access the cloud servers in country A. However, this method needs to modify the tag of the device at each test so that a certain amount of workload of manual intervention exists, resulting in low access efficiency. Moreover, since the tag of the device is modified, the customers may consider that the test is performed on different devices and have low acceptance of the test results.

SUMMARY

Embodiments of the present application provide a device cross-region access method, an electronic device, and a non-transitory computer-readable storage medium to improve the efficiency of the device cross-region access.

An embodiment of the present application provides a device cross-region access method. The method is executed by a target server and includes the steps below.

A cross-region access request is received from a target device and Internet protocol (IP) address information in the cross-region access request is determined.

Information of a cross-region proxy server matching the target device is determined according to the IP address information. The cross-region proxy server is preset in a proxy region different from a target region where the target server is located, and the cross-region proxy server and the target server are in a distributed deployment.

The information of the cross-region proxy server is transmitted to the target device to enable the target device to establish a connection to the cross-region proxy server.

An embodiment of the present application provides a device cross-region access method. The method is executed by a cross-region proxy server and includes the steps below.

Identification information of a to-be-accessed target device transmitted by a target server is received. The cross-region proxy server is preset in a proxy region different from a target region where the target server is located, and the cross-region proxy server and the target server are in a distributed deployment.

A connection between the target device and the cross-region proxy server is established in response to an access request transmitted by the target device and according to the identification information of the target device. The access request is determined by the target device according to information of the cross-region proxy server transmitted by the target server.

An embodiment of the present application provides a device cross-region access method. The method is executed by a target device and includes the steps below.

A cross-region access request is transmitted to a matching target server, and information of a cross-region proxy server returned by the target server is received. The information of the cross-region proxy server is determined by the target server according to IP address information in the cross-region access request, the cross-region proxy server is preset in a proxy region different from a target region where the target server is located, and the cross-region proxy server and the target server are in a distributed deployment.

An access request is transmitted to the cross-region proxy server according to the information of the cross-region proxy server to establish a connection to the cross-region proxy server.

An embodiment of the present application further provides a device cross-region access apparatus. The apparatus is executed by a target server and includes an access request reception module, a proxy server determination module, and a proxy server transmission module.

The access request reception module is configured to receive a cross-region access request from a target device and determine IP address information in the cross-region access request.

The proxy server determination module is configured to determine information of a cross-region proxy server matching the target device according to the IP address information, where the cross-region proxy server is preset in a proxy region different from a target region where the target server is located, and the cross-region proxy server and the target server are in a distributed deployment.

The proxy server transmission module is configured to transmit the information of the cross-region proxy server to the target device to enable the target device to establish a connection to the cross-region proxy server.

An embodiment of the present application further provides a device cross-region access apparatus. The apparatus is executed by a cross-region proxy server and includes a device identification reception module and an access connection module.

The device identification reception module is configured to receive identification information of a to-be-accessed target device transmitted by a target server, where the cross-region proxy server is preset in a proxy region different from a target region where the target server is located, and the cross-region proxy server and the target server are in a distributed deployment.

The access connection module is configured to establish a connection between the target device and the cross-region proxy server in response to an access request transmitted by the target device and according to the identification information of the target device, where the access request is determined by the target device according to information of the cross-region proxy server transmitted by the target server.

An embodiment of the present application further provides a device cross-region access apparatus. The apparatus is executed by a target device and includes a target server transmission module, and a proxy server transmission module.

The target server transmission module is configured to transmit a cross-region access request to a matching target server, and receive information of a cross-region proxy server returned by the target server, where the information of the cross-region proxy server is determined by the target server according to IP address information in the cross-region access request, the cross-region proxy server is preset in a proxy region different from a target region where the target server is located, and the cross-region proxy server and the target server are in a distributed deployment.

The proxy server transmission module is configured to transmit an access request to the cross-region proxy server according to the information of the cross-region proxy server to establish a connection to the cross-region proxy server.

An embodiment of the present disclosure further provides an electronic device. The electronic device includes one or more processors, and a storage apparatus configured to store one or more programs, where the one or more programs, when executed by the one or more processors, cause the one or more processors to perform the device cross-region access method described any one of the embodiments of the present application.

An embodiment of the present application further provides a computer-readable storage medium storing a computer program, where the computer program, when executed by a processor, performs the device cross-region access method described any one of the embodiments of the present application.

DETAILED DESCRIPTION

The present application is described hereinafter in conjunction with drawings and embodiments. It is to be understood that the embodiments set forth below are intended to illustrate but not to limit the present application. Additionally, it is to be noted that to facilitate description, only part, not all, of structures related to the present application are illustrated in the drawings.

Embodiment One

Figure 1:
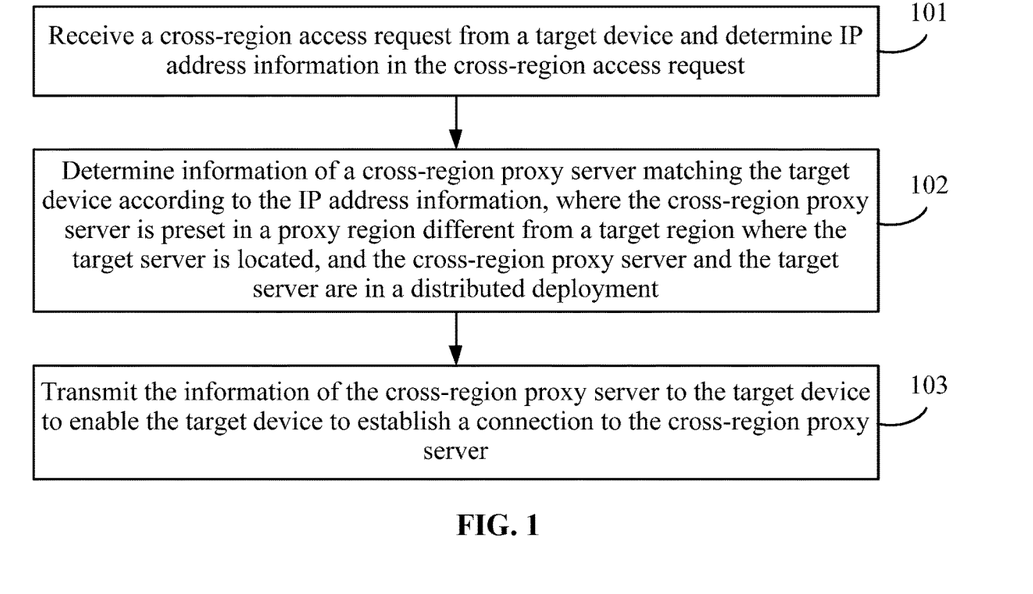
FIG. 1 is a flowchart of a device cross-region access method according to embodiment one of the present application.

FIG. 1 is a flowchart of a device cross-region access method according to embodiment one of the present application. This embodiment is applicable to the case where a device applicable to a target region is tested in a proxy region, and is executed by a target server set in the target region, where the target device is applicable to use in the target region. The method may be executed by a device cross-region access apparatus. The apparatus may be implemented by software and/or hardware and configured in an electronic device, such as a backend server having communications and calculation capabilities. As shown in FIG. 1, the method includes the steps below.

In step 101, a cross-region access request is received from a target device and IP address information in the cross-region access request is determined.

The target device refers to a functional device that needs to be connected to the server to complete a specific function, such as a camera and a mobile phone, and the target device supports being used in a specific region. For example, parameters set for cameras of the same type sold to different countries are not the same, each of the different countries has a set of cloud servers established and databases in the servers are independent so that the devices located in the specific region to which the devices are sold can access the cloud servers in the region. The cross-region access request may be transmitted in the form of a keep-alive message.

However, in some specific circumstances, these devices that can be accessed in a specific region need to be short-term accessed in other regions. For example, customers in some regions take the initiative to inspect the devices sold to the specific region at the manufacturer's location, but the manufacturer's location is not in the specific region. Therefore, if the devices in the specific region are directly tested at the manufacturer's location, it is feasible to cause the devices in the specific region to be connected to the server in the specific region by default, and cause long-time access and access failure due to reasons such as distance and network. In the embodiments of the present application, in this case, the target device transmits the cross-region access request at the manufacturer's location. The target server refers to a server set in the region to which the target device is sold. The target region refers to a region to which the target device is sold or the region where the server to which the target device is connected by default is located. A cross-region proxy server refers to a server set close to the manufacturer's location.

When the target device does not initiate the access request in the target region, and the target region is far away from the location where the target device initiates the request, the target device triggers to initiate the cross-region access request. The distance of the target device from the target region may be determined according to the network transmission situation, which is not limited herein. Since the target device is sold to the target region, the cross-region access request is transmitted to the target server by default. The target server receives the cross-region access request and acquires IP address information carried in the cross-region access request, where the IP address information indicates the location of the target device when the target device initiates the cross-region access request.

In step 102, information of a cross-region proxy server matching the target device is determined according to the IP address information. The cross-region proxy server is preset in a proxy region different from a target region where the target server is located, and the cross-region proxy server and the target server are in a distributed deployment.

The proxy server is preset in a region other than the target region. The proxy server and the target server in the target region form a distributed system. The database in the proxy server is consistent with the database in the target server. The target server is used as a central server, and the setting region of the proxy server and the number of proxy servers may be set according to the actual situation. For example, for a device manufacturer, the customers typically choose to go to the manufacturer's location to test the devices. Therefore, the region where the manufacturer needing to perform the device test is located is set as the proxy region, and the proxy servers are set in the proxy region or dispersedly set in a region convenient for traffic to facilitate choosing an appropriate region to perform the device test by the customers.

The region where the target device initiates the cross-region access request is determined according to the IP address, and the proxy server in this region is used as the cross-region proxy server matching the target device for the cross-region access. The information of the cross-region proxy server includes address information of the proxy server to facilitate determining the proxy server by the target device.

In an optional embodiment, the step 102 includes that a home of the target device is determined according to the IP address information, and the cross-region proxy server matching the target device is determined from candidate proxy servers according to a distance between the home of the target device and a setting region of each of the candidate proxy servers.

The candidate proxy servers refer to preset server nodes that form a distributed deployment with the target server. For example, the mapping relationship between the home and the candidate proxy servers is preset.

The home of the target device when the target device transmits the cross-region access request is determined according to the IP address information, and the candidate proxy server closest to the home is selected from the candidate proxy servers as the cross-region proxy server matching the target device according to the distance between the home and the setting region of each of the candidate proxy servers.

If a proxy server node of the target server is set in the proxy region where the target device initiates the cross-region access request, the proxy server is directly used as the cross-region proxy server. If the proxy server node of the target server is not set in the proxy region where the target device initiates the cross-region access request, the proxy server closest to the target device in the peripheral region of the proxy region is determined as the proxy server of the target device for this cross-region access. This ensures that the distance between the target device and the determined cross-region proxy server is the shortest, improving the access efficiency of the target device.

In step 103, the information of the cross-region proxy server is transmitted to the target device to enable the target device to establish a connection to the cross-region proxy server.

After determining the proxy server closest to the home of the target device, the target server transmits the information of the proxy server to the target device to enable the target device to determine the proxy server to be connected according to a proxy server address in the information of the proxy server.

For example, the target device transmits a keep-alive message to the target server, and the target server determines information of the proxy server corresponding to the home according to the IP address information in the keep-alive message and carries address information of the proxy server in the keep-alive message and sends it to the target device.

In the embodiments of the present application, the cross-region proxy server is preset in the proxy region, and after the target server receives the cross-region access request of the target device, the target server matches an appropriate cross-region proxy server to the target device to ensure the target device to be connected with the cross-region proxy server having a relatively short distance from the target device, avoiding that the long access time caused by the connection to the target server when the target device performs the cross-regional access in the proxy region affects the access efficiency, thereby improving the cross-regional access efficiency of the target device.

In an optional embodiment, the cross-region access request further includes identification information of the target device.

After the step in which the information of the cross-region proxy server matching the target device is determined according to the IP address information, the method further includes the following: The identification information of the target device is transmitted to the cross-region proxy server to enable the cross-region proxy server to establish the connection to the target device according to the identification information of the target device.

The identification information of the target device is used for uniquely representing the identity of the target device. For example, when transmitting the cross-region access request to the target server, the target device carries a unique device identification code of the target device in the request.

After determining the cross-region proxy server of the target device, the target server transmits the identification information of the target device to the cross-region proxy server to enable the cross-region proxy server to establish the connection to the target device according to the identification information of the target device, avoiding the access failure caused by the connection error, and improving the access accuracy between the target device and the cross-region proxy server.

In an optional embodiment, the cross-region access request further includes a cross-region access duration threshold of the target device and/or a cross-region access number threshold of the target device. The step in which the information of the cross-region proxy server matching the target device is determined according to the IP address information, the method further includes the following: The cross-region access duration threshold of the target device and/or the cross-region access number threshold of the target device is transmitted to the cross-region proxy server to enable the cross-region proxy server to control the cross-region access of the target device according to the cross-region access duration threshold and/or the cross-region access number threshold of the target device.

The target device is connected to the target server in the target region to avoid cross-region sales of the device, and to ensure this feature, the cross-region access duration threshold and/or the cross-region access number threshold is preset for the target device to limit the total duration and the total number of cross-region accesses of the target device, thereby achieving the effect of isolation and avoiding the cross-region sales of the device.

The cross-region access duration threshold of the target device and/or the cross-region access number threshold of the target device is preset. For example, one limit value for the cross-region accesses of the target device is set according to the actual scenarios, and the magnitude of the limit value is not limited herein.

After determining the cross-region proxy server of the target device, the target server transmits the cross-region access duration threshold of the target device and/or the cross-region access number threshold of the target device to the cross-region proxy server to enable the cross-region proxy server to establish the connection to the target device. That is, after the cross-region proxy server establishes the connection to the target device, the time countdown starts, and when a connection duration reaches the duration threshold and/or the number of connections reaches the access number threshold, the cross-region proxy server disconnects from the target device, ensuring both the cross-region access effect of the target device and the isolation scheduling effect of the device, and avoiding the cross-region sales of the device.

In an optional embodiment, the method further includes the following: A connection record transmitted by the cross-region proxy server after the cross-region proxy server completes the connection to the target device is received and stored. After the step in which the cross-region access request is received from the target device, the method further includes the followings: The connection record is queried, and the cross-region access of the target device is controlled according to a query result of the connection record.

The connection record is transmitted by the cross-region proxy server to the target server after the cross-region proxy server completes the connection to the target device. For example, after receiving the cross-region access duration threshold and/or the cross-region access number threshold, the cross-region proxy server determines the connection to the target device. If the connection duration reaches the duration threshold and/or the number of connections reaches the number threshold, the cross-region proxy server transmits a historical connection record with the target device to the target server to enable the target server to know that the target device has completed the cross-region access, avoiding the cross-region sales of the device on the market caused by the repeated cross-region accesses.

After receiving the cross-region access request of the target device, the target server queries the stored record to determine whether a connection record exists. If the connection record exists, it indicates that the target device has reached the threshold of cross-region accesses, the cross-region access is no longer allowed, and the target server denies the cross-region access of the target device and maintains the connection between the target device and the target server. If no connection record exists, it indicates that the target device has not reached the threshold of cross-region accesses and the cross-region access is still allowed, and the target server determines the information of the cross-region proxy server matching the target device according to the IP address information and transmits the information of the cross-region proxy server to the target device to establish the connection between the target device and the cross-region proxy server.

The connection record is stored so that the target server can determine the cross-region access situation of the target device, thereby ensuring the accurate control of the cross-region access of the target device, and avoiding the cross-region sales of the device.

Embodiment Two

Figure 2:
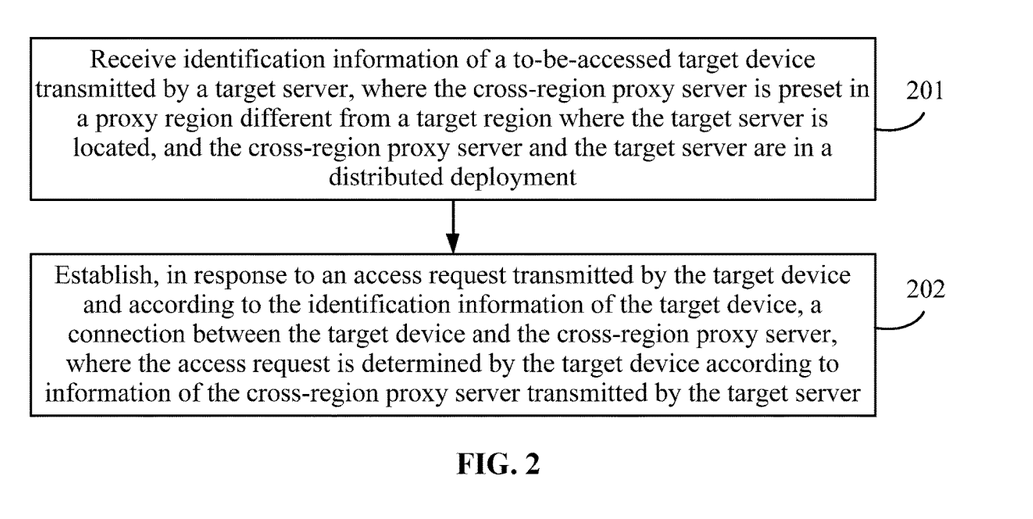
FIG. 2 is a flowchart of a device cross-region access method according to embodiment two of the present application.

FIG. 2 is a flowchart of a device cross-region access method according to embodiment two of the present application. This embodiment is applicable to the case where a device applicable to a target region is tested in a proxy region, and is executed by a cross-region proxy server set in the proxy region, where a target device applicable to the target region may establish a connection to the cross-region proxy server in the proxy region. The method may be executed by a device cross-region access apparatus. The apparatus may be implemented by software and/or hardware and configured in an electronic device, such as a backend server having communications and calculation capabilities. As shown in FIG. 2, the method includes the steps below.

In step 201, identification information of a to-be-accessed target device transmitted by a target server is received, where the cross-region proxy server is preset in a proxy region different from a target region where the target server is located, and the cross-region proxy server and the target server are in a distributed deployment.

The cross-region proxy server is set in the proxy region and is close to the home when the target device initiates the cross-region access request, so the access efficiency of the target device can be ensured. Moreover, to ensure the accuracy of the connection between the cross-region proxy server and the target device and avoid causing misconnection, the cross-region proxy server receives the identification information of the target device transmitted by the target server, and a target device carrying the identification information of the target device is the device to be accessed by the cross-region proxy server.

In step 202, a connection between the target device and the cross-region proxy server is established in response to an access request transmitted by the target device and according to the identification information of the target device, where the access request is determined by the target device according to information of the cross-region proxy server transmitted by the target server.

The cross-region proxy server receives the identification information of the target device transmitted by the target server. Moreover, after receiving the information of the cross-region proxy server transmitted by the target server, the target device transmits the access request to the cross-region proxy server according to the address of the cross-region proxy server. After receiving the access request, the cross-region proxy server determines whether the target device transmitting the access request is the to-be-accessed target device according to a comparison result of the identification information of the target device included in the access request and the identification information of the target device transmitted by the target server. If the comparison is consistent, the connection between the target device and the cross-region proxy server is established.

In the embodiments of the present application, the description of the cross-region proxy server, the target device, and the target server may refer to that in embodiment one, and details are not repeated herein.

In the embodiments of the present application, the cross-region proxy server is preset in the proxy region, and the cross-region proxy server establishes the connection to the target device according to the identification information of the target device transmitted by the target server and the access request transmitted by the target device, improving the accuracy of the connection between the target device and the cross-region proxy server, avoiding that the long access time caused by the connection to the target server when the target device performs the cross-regional access in the proxy region affects the access efficiency, thereby improving the cross-regional access efficiency of the target device.

In an optional embodiment, the method further includes the followings: A cross-region access duration threshold of the target device and/or a cross-region access number threshold of the target device transmitted by the target server is received, and the connection between the cross-region proxy server and the target device is controlled according to the comparison result of connection information between the cross-region proxy server and the target device with the cross-region access duration threshold and/or the cross-region access number threshold.

The target device is connected to the target server in the target region to avoid cross-region sales of the device, and to ensure this feature, the cross-region access duration threshold and/or the cross-region access number threshold is preset for the target device to limit the total duration and the total number of cross-region accesses of the target device, thereby achieving the effect of isolation and avoiding the cross-region sales of the device.

The cross-region access duration threshold of the target device and/or the cross-region access number threshold of the target device is preset. For example, one limit value for the cross-region accesses of the target device is set according to the actual scenarios, and the magnitude of the limit value is not limited herein.

After determining the cross-region proxy server of the target device, the target server transmits the cross-region access duration threshold of the target device and/or the cross-region access number threshold of the target device to the cross-region proxy server to enable the cross-region proxy server to establish the connection to the target device. That is, after the cross-region proxy server establishes the connection to the target device, the time countdown and/or times countdown starts, and when a connection duration reaches the duration threshold and/or the number of connections reaches the number threshold, the cross-region proxy server disconnects from the target device, ensuring both the cross-region access effect of the target device and the isolation scheduling effect of the device, and avoiding the cross-region sales of the device.

In an optional embodiment, the connection information includes the connection duration and/or the number of connections between the cross-region proxy server and the target device.

The step in which the connection between the cross-region proxy server and the target device is controlled according to the comparison result of the connection information between the cross-region proxy server and the target device with the cross-region access duration threshold and/or the cross-region access number threshold includes the followings: If the connection duration is greater than the access duration threshold and/or the number of connections is greater than the number threshold, a cross-region access prohibition notification is transmitted to the target device to enable the target device to be directly connected to the target server; and/or a target device connection completion notification and a connection record are transmitted to the target server to enable the target server to store the connection record; and/or an access end notification is transmitted to a client connected to the target device.

The connection information indicates duration information of the actual connection between the target device and the cross-region proxy server and/or information of the number of actual connections between the target device and the cross-region proxy server. Whether the actual connection of the target device reaches an access threshold is determined according to the comparison result of the duration information of the actual connection with the cross-region access duration threshold and/or the comparison result of the information of the number of the actual connections with the cross-region access number threshold.

If the actual connection of the target device reaches the access threshold, a cross-region access prohibition notification is transmitted to the target device to enable the target device to be directly connected to the target server. The cross-region access prohibition notification is transmitted to the target device so that the target device cannot transmit the cross-region access request and can only transmit the access request for establishing the connection to the target server.

The target device connection completion notification and the connection record are transmitted to the target server to enable the target server to store the connection record. After determining that the target device reaches the access threshold, the cross-region proxy server transmits a historical connection record with the target device to the target server to enable the target server to know that the target device has completed the cross-region access, avoiding the cross-region sales of the device on the market caused by the repeated cross-region accesses. The connection record is transmitted so that the target server can determine the cross-region access situation of the target device, thereby ensuring the accurate control of the cross-region access of the target device, and avoiding the cross-region sales of the device.

The access end notification is transmitted to the client connected to the target device. The client refers to a device connected to the target device through the cross-region proxy server. For example, after the connection between an Application (APP) on the client and the target device is established, the APP may access and control the target device. When the connection between the target device and the cross-region proxy server reaches the access threshold, a message is transmitted to the APP connected to the target device to notify the client that the target device no longer provides cross-region access services. For example, a corresponding interface can be displayed on the client to prompt the user.

After the connection between the cross-region proxy server and the target device reaches the threshold, messages are transmitted to the target server, the target device, and the client, respectively, to notify the participants to improve the mastery degree of the cross-region access of the target device.

In an optional embodiment, the method further includes the following: A target device access request transmitted by a client establishing the connection to the target device is received, where the target device access request includes identification information of the target device; and the connection result between the target device and the cross-region proxy server is queried according to the identification information of the target device, and the connection result is transmitted to the client to enable the client to access the target device according to the connection result.

The client refers to an application that can view and control the target device, such as an APP on a mobile phone. The client pre-stores address information of all servers, so the client can directly select a server to connect according to the server to which the target device is connected. For example, after the client starts, the client queries the home according to a BeiDou system or a global positioning system (GPS) information or according to an IP address of the client itself, selects a cross-region proxy server according to information of the region where the client is located, and connects to the cross-region proxy server. Alternatively, after pre-determining information of the cross-region proxy server to which the target device is connected, the client manually switches to the selected server selected to connect and establishes a connection to the cross-region proxy server.

After the client is connected to the cross-region proxy server, the client determines the identification information of the connected device by an account system preset by the server or transmits the identification information, which needs to be added to the client, of the target device to the cross-region proxy server by scanning a two-dimensional code of the target device. After receiving the target device access request, the cross-region proxy server needs to determine the connection situation between the target device and the cross-region proxy server. The cross-region proxy server queries the connection situation between the target device and the cross-region proxy server according to the identification information of the device in the target device access request. If the target device is connected to the cross-region proxy server, the connection between the client and the target device is established; and if the target device is not connected to the cross-region proxy server, the client is notified of failing to access the target device.

The cross-region proxy server can achieve the connection between the client and the target device, reduce the connection link between the client and the target device, and improve the connection efficiency.

Embodiment Three

Figure 3:
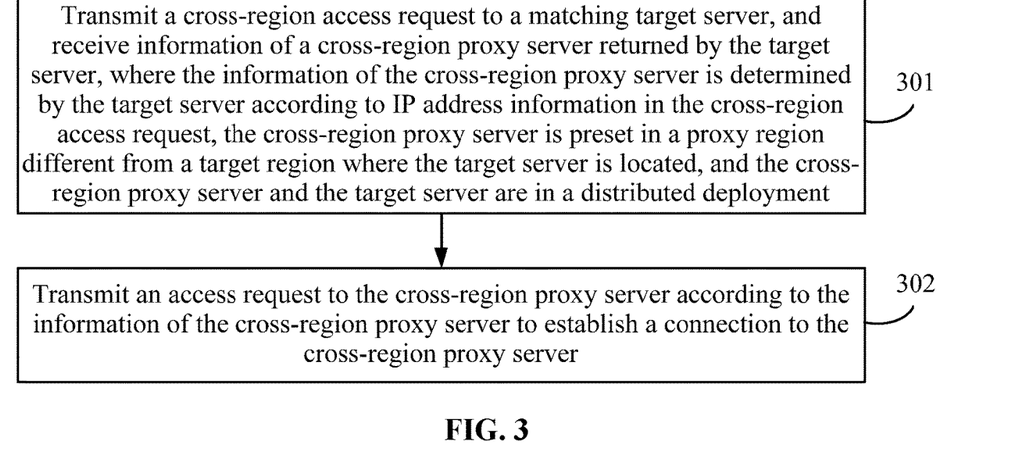
FIG. 3 is a flowchart of a device cross-region access method according to embodiment three of the present application.

FIG. 3 is a flowchart of a device cross-region access method according to embodiment three of the present application. This embodiment is applicable to the case where a device applicable to a target region is tested in a proxy region, and is executed by a target device, where the target device is applicable to use in the target region, and a cross-region proxy server is set in the proxy region to achieve the cross-region access. The method may be executed by a device cross-region access apparatus. The apparatus may be implemented by software and/or hardware and configured in a terminal device. For example, the electronic device may be a functional device such as a camera. As shown in FIG. 3, the method includes the steps below.

In step 301, a cross-region access request is transmitted to a matching target server, and information of a cross-region proxy server returned by the target server is received, where the information of the cross-region proxy server is determined by the target server according to IP address information in the cross-region access request, the cross-region proxy server is preset in a proxy region different from a target region where the target server is located, and the cross-region proxy server and the target server are in a distributed deployment.

The target device transmits a cross-region access request to a target server matching the target device when the target device needs to perform the cross-region access, where the target server matching the target device is predetermined, for example, determined according to a sales region of the target device. After receiving the cross-region access request of the target device, the target server determines the information of the cross-region proxy server matching the home of the target device according to the IP address in the cross-region access request.

In step 302, an access request is transmitted to the cross-region proxy server according to the information of the cross-region proxy server to establish a connection to the cross-region proxy server.

After receiving the information of the cross-region proxy server, the target device transmits the access request to the cross-region proxy server according to the address information of the cross-region proxy server in the information of the cross-region proxy server to request to establish the connection between the target device and the cross-region proxy server.

In the embodiments of the present application, the description of the cross-region proxy server, the target device, and the target server may refer to that in the above embodiments, and details are not repeated herein.

In the embodiments of the present application, the cross-region proxy server is preset in the proxy region, and the information of the cross-region proxy server is transmitted to the target device by the target server matching the target device, achieving the connection between the target device and the cross-region proxy server in the proxy region, reducing the message interaction link, and improving the access efficiency.

In an optional embodiment, the method further includes the following: A cross-region access prohibition notification transmitted by the cross-region proxy server is received, and the connection to the target server is established according to the cross-region access prohibition notification.

When the cross-region proxy server determines that the connection to the target device reaches an access threshold, the cross-region proxy server transmits the cross-region access prohibition notification to the target device to enable the target device to be directly connected to the target server. For example, the cross-region proxy server transmits the cross-region access prohibition notification to the target device so that the target device cannot transmit the cross-region access request and can transmit only the access request for establishing the connection to the target server. The cross-region access prohibition notification is transmitted to the target device, avoiding the transmission of the cross-region access request in the case where the target device does not have the allowance of the cross-region access, resulting in a waste of resources.

Embodiment Four

Figure 4:
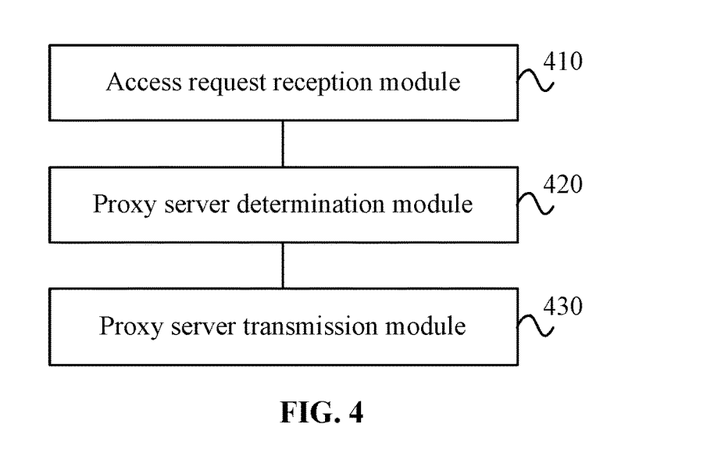
FIG. 4 is a structure diagram of a device cross-region access apparatus according to embodiment four of the present application.

FIG. 4 is a structure diagram of a device cross-region access apparatus according to embodiment four of the present application. This embodiment is applicable to the case where a device applicable to a target region is tested in a proxy region, and is executed by a target server set in the target region, where the target device is applicable to use in the target region. As shown in FIG. 4, the apparatus includes an access request reception module 410, a proxy server determination module 420, and a proxy server transmission module 430. The access request reception module 410 is configured to receive a cross-region access request from a target device and determine IP address information in the cross-region access request. The proxy server determination module 420 is configured to determine information of a cross-region proxy server matching the target device according to the IP address information, where the cross-region proxy server is preset in a proxy region different from a target region where the target server is located, and the cross-region proxy server and the target server are in a distributed deployment. The proxy server transmission module 430 is configured to transmit the information of the cross-region proxy server to the target device to enable the target device to establish a connection to the cross-region proxy server.

In the embodiments of the present application, the cross-region proxy server is preset in the proxy region, and after the target server receives the cross-region access request from the target device, the target server matches an appropriate cross-region proxy server to the target device to ensure the target device to be connected to the cross-region proxy server having a relatively short distance from the target device, avoiding that the long access time caused by the connection to the target server when the target device performs the cross-regional access in the proxy region affects the access efficiency, thereby improving the cross-regional access efficiency of the target device.

Optionally, the proxy server determination module 420 is configured to determine a home of the target device according to the IP address information, and determine the cross-region proxy server matching the target device from candidate proxy servers according to a distance between the home of the target device and a setting region of each of the candidate proxy servers.

Optionally, the cross-region access request further includes identification information of the target device.

The proxy server transmission module 430 is further configured to transmit the identification information of the target device to the cross-region proxy server to enable the cross-region proxy server to establish the connection to the target device according to the identification information of the target device.

Optionally, the cross-region access request further includes a cross-region access duration threshold of the target device and/or a cross-region access number threshold of the target device.

The apparatus further includes an access threshold transmission module configured to, after determining the information of the cross-region proxy server matching the target device according to the IP address information, transmit the cross-region access duration threshold of the target device and/or the cross-region access number threshold of the target device to the cross-region proxy server to enable the cross-region proxy server to control a cross-region access of the target device according to the cross-region access duration threshold and/or a cross-region access number threshold.

Optionally, the apparatus further includes a connection record storage module configured to receive and store a connection record transmitted by the cross-region proxy server after the cross-region proxy server completes the connection to the target device. The apparatus further includes a target device access control module configured to, after receiving the cross-region access request from the target device, query the connection record, and control the cross-region access of the target device according to a query result of the connection record.

The device cross-region access apparatus provided in the embodiments of the present application may execute the device cross-region access method according to any embodiment of the present application and has corresponding functional modules for executing the device cross-region access method.

Embodiment Five

Figure 5:
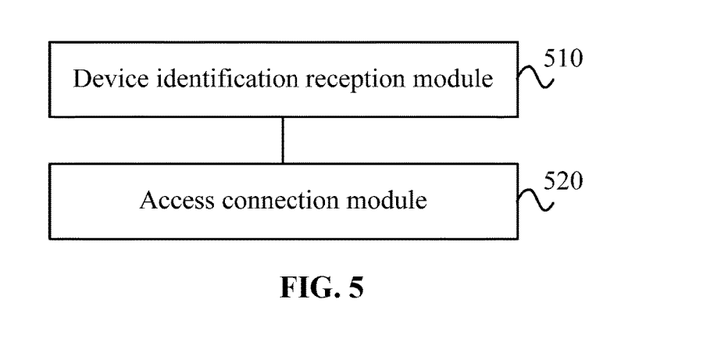
FIG. 5 is a structure diagram of a device cross-region access apparatus according to embodiment five of the present application.

FIG. 5 is a structure diagram of a device cross-region access apparatus according to embodiment five of the present application. This embodiment is applicable to the case where a device applicable to a target region is tested in a proxy region, and is executed by a cross-region proxy server set in the proxy region, where a target device applicable to the target region may establish a connection to the cross-region proxy server in the proxy region. As shown in FIG. 4, the apparatus includes a device identification reception module 510 and an access connection module 520. The device identification reception module 510 is configured to receive identification information of a to-be-accessed target device transmitted by a target server, where the cross-region proxy server is preset in a proxy region different from a target region where the target server is located, and the cross-region proxy server and the target server are in a distributed deployment. The access connection module 520 is configured to establish a connection between the target device and the cross-region proxy server in response to an access request transmitted by the target device and according to the identification information of the target device, where the access request is determined by the target device according to information of the cross-region proxy server transmitted by the target server.

In the embodiments of the present application, the cross-region proxy server is preset in the proxy region, and the cross-region proxy server establishes the connection to the target device according to the identification information of the target device transmitted by the target server and the access request transmitted by the target device, improving the accuracy of the connection between the target device and the cross-region proxy server, avoiding that the long access time caused by the connection to the target server when the target device performs the cross-regional access in the proxy region affects the access efficiency, thereby improving the cross-regional access efficiency of the target device.

Optionally, the apparatus further includes a target device control module. The target device control module includes an access threshold reception unit and an access threshold comparison unit. The access threshold reception unit is configured to receive a cross-region access duration threshold of the target device and/or a cross-region access number threshold of the target device, where the cross-region access duration threshold of the target device and/or the cross-region access number threshold of the target device is transmitted by the target server. The access threshold comparison unit is configured to control the connection between the cross-region proxy server and the target device according to the comparison result of connection information between the cross-region proxy server and the target device with the cross-region access duration threshold and/or the cross-region access number threshold.

Optionally, the connection information includes a connection duration and/or the number of connections between the cross-region proxy server and the target device.

The access threshold comparison unit is configured to, if the connection duration is greater than the cross-region access duration threshold and/or the number of connections is greater than the cross-region access number threshold, transmit a cross-region access prohibition notification to the target device to enable the target device to be directly connected to the target server; and/or transmit a target device connection completion notification and a connection record to the target server to enable the target server to store the connection record; and/or transmit an access end notification to a client connected to the target device.

Optionally, the apparatus further includes a client connection module. The client connection module is configured to receive a target device access request transmitted by a client that establishes a connection to the target device, where the target device access request includes the identification information of the target device; and query a connection result between the target device and the cross-region proxy server according to the identification information, and transmit the connection result to the client to enable the client to access the target device according to the connection result.

The device cross-region access apparatus provided in the embodiments of the present application may execute the device cross-region access method according to any embodiment of the present application and has corresponding functional modules for executing the device cross-region access method.

Embodiment Six

Figure 6:
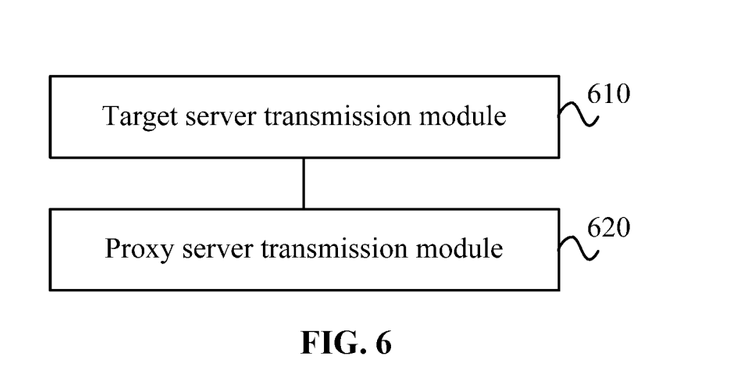
FIG. 6 is a structure diagram of a device cross-region access apparatus according to embodiment six of the present application.

FIG. 6 is a structure diagram of a device cross-region access apparatus according to embodiment six of the present application. This embodiment is applicable to the case where a device applicable to a target region is tested in a proxy region, and is executed by a target device, where the target device is applicable to use in the target region, and a cross-region proxy server is set in the proxy region to achieve the cross-region access. As shown in FIG. 6, the apparatus includes a target server transmission module 610 and a proxy server transmission module 620. The target server transmission module 610 is configured to transmit a cross-region access request to a matching target server, and receive information of a cross-region proxy server returned by the target server, where the information of the cross-region proxy server is determined by the target server according to IP address information in the cross-region access request, the cross-region proxy server is preset in a proxy region different from a target region where the target server is located, and the cross-region proxy server and the target server are in a distributed deployment. The proxy server transmission module 620 is configured to transmit an access request to the cross-region proxy server according to the information of the cross-region proxy server to establish a connection between the target device and the cross-region proxy server.

In the embodiments of the present application, the cross-region proxy server is preset in the proxy region, and the information of the cross-region proxy server is transmitted to the target device by the target server matching the target device, achieving the connection between the target device and the cross-region proxy server in the proxy region, reducing the message interaction link, and improving the access efficiency.

Optionally, the apparatus further includes an access prohibition notification reception module. The access prohibition notification reception module is configured to receive a cross-region access prohibition notification transmitted by the cross-region proxy server and establish a connection between the target device and the target server according to the cross-region access prohibition notification.

The device cross-region access apparatus provided in the embodiments of the present application may execute the device cross-region access method according to any embodiment of the present application and has corresponding functional modules for executing the device cross-region access method.

Embodiment Seven

Figure 7:
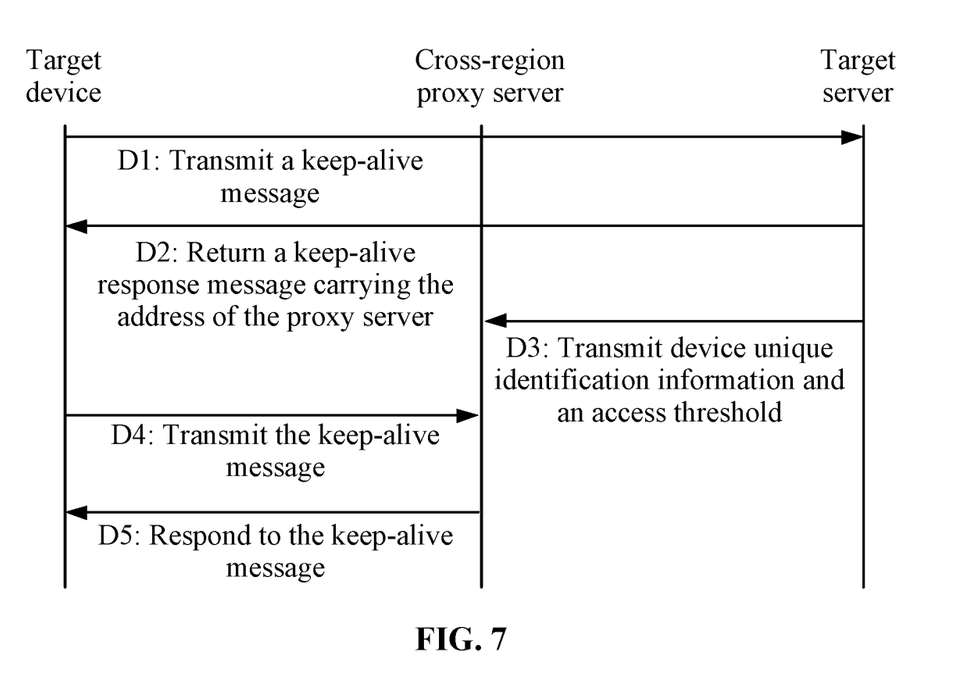
FIG. 7 is a timing diagram illustrating connections of a target device in a device cross-region access system according to embodiment seven of the present application.

In a target device, a matching target server is preconfigured for the target device according to the designated sales region of the target device. To achieve a quick cross-region access of the target device in a proxy region, a cross-region proxy server is set in the proxy region in the system to achieve a quick cross-region connection of the target device. The device cross-region access system includes the target device, the cross-region proxy server, the target server, and the client that are described in the above embodiments, and details are not repeated herein. The system can achieve the quick cross-region access of the client and the target device in the proxy region. First, a connection between the target device and the cross-region proxy server needs to be established. FIG. 7 is a timing diagram illustrating connections of a target device in a device cross-region access system according to embodiment seven of the present application.

In D1: the target device transmits a keep-alive message to the preset target server matching the target device, where the keep-alive message includes IP address information of the target device, device unique identification information, and a cross-region access duration threshold of the target device and/or a cross-region access number threshold of the target device.

In D2: the target server queries an IP home according to the IP address information of the target device in the keep-alive message. The proxy server in this region is used as the cross-region proxy server, and the address of the cross-region proxy server is carried in a keep-alive response message and transmitted to the target device. If no proxy server of the target server is set in this region, a proxy server closest to the IP home is determined as the cross-region proxy server according to the IP home.

In D3: after determining the cross-region proxy server, the target server transmits the device unique identification information transmitted by the target device and the cross-region access duration threshold of the target device and/or the cross-region access number threshold of the target device to the cross-region proxy server.

In D4: after receiving the keep-alive response message transmitted by the target server, the target device parses the keep-alive response message to obtain an address of the cross-region proxy server in the keep-alive response message and transmits the keep-alive message to the cross-region proxy server.

In D5: after receiving the keep-alive message transmitted by the target device, the cross-region proxy server verifies the keep-alive message according to a device unique identification transmitted by the target server. If determining that the device unique identification transmitted by the target server matches and is consistent with the device unique identification information in the keep-alive message, the cross-region proxy server responds to the target device with a keep-alive success message. In addition, the target device periodically (e.g., 30 seconds) transmits the keep-alive message to the cross-region proxy server before receiving the keep-alive success message that the cross-region proxy server responds to.

After the scheduling of the device cross-region access system, the target device establishes a connection to the proxy server in the proxy region where the target device is located so that the subsequent connection to the client is performed by the connection services provided by this proxy server and no longer by the target server in the target region, shortening the message interaction link.

In the device cross-region access system, to ensure the isolation scheduling effect of the target device, i.e., to avoid the cross-region sales of the device, the target server transmits the cross-region access duration threshold of the target device and/or the cross-region access number threshold of the target device to the cross-region proxy server, thereby achieving the isolation scheduling of the device.

After the target device establishes the connection to the cross-region proxy server, or the client establishes the connection to the target device by the cross-region proxy server, the cross-region proxy server counts down the cross-region access of the target device according to the cross-region access duration threshold of the target device and/or the cross-region access number threshold of the target device.

After the cross-region access duration threshold of the target device and/or the cross-region access number threshold of the target device is cleared, the cross-region proxy server transmits messages to the client, the target device, and the target server, respectively. The cross-region proxy server transmits a message to the client connected to the target device and notifies that the target device has reached the cross-region access threshold and no longer provides cross-region access services, such as providing a corresponding interface display on the client to prompt the user. The cross-region proxy server transmits a cross-region access prohibition notification to the target device to enable the target device to perform a keep-alive connection to the target server next time. The cross-region proxy server transmits a target device connection completion notification and transmits a connection record to the target server, and after receiving the connection record, the target server records the connection record of the target device in a database, and moreover, the cross-region proxy server removes device information of the target device from a list of available devices in the database, or backs up the device information of the target device to a list of devices that have been connected. When the target device is powered on again and transmits the keep-alive message to the target server, the target server queries that the target device already has a connection record and no longer performs the operation of connection scheduling so that the target device cannot be connected to the cross-region proxy server but can be connected to the target server located in the target region. In this manner, the target device is normally used in the target region.

It is feasible to, in conjunction with the actual application scenario, for example, in which the access threshold needs to be adjusted, transmit an update access threshold of the target device to the cross-region proxy server by the target server to adaptively adjust the period of the cross-region access of the target device.

Figure 8:
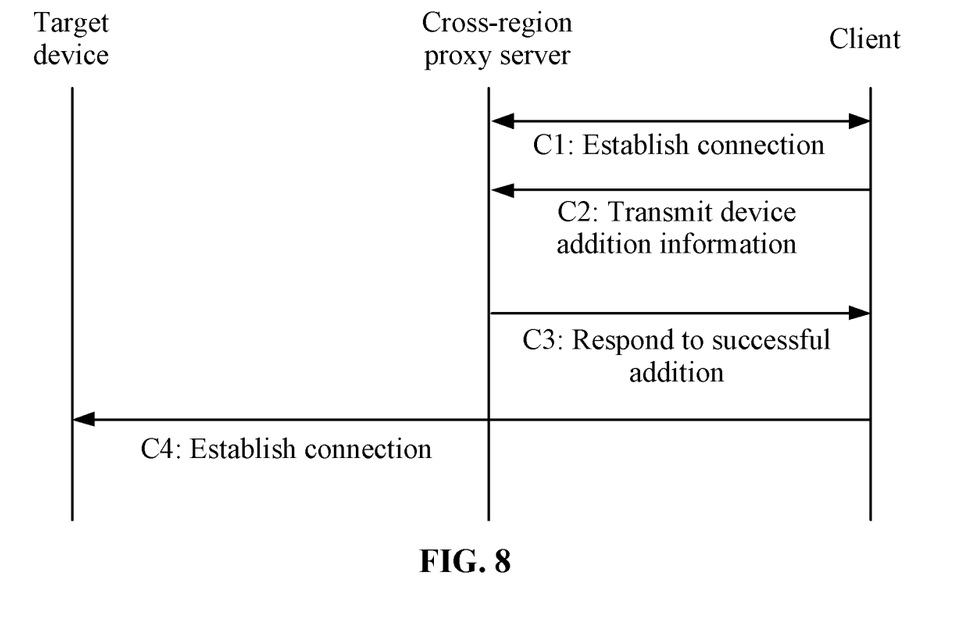
FIG. 8 is a timing diagram illustrating connections of a client in a device cross-region access system according to embodiment seven of the present application.

After the target device is connected to the cross-region proxy server, it is needed to establish the connection between the client and the target device. First, it is needed to establish the connection between the client and the cross-region proxy server, and then the connection between the target device and the client is achieved by the cross-region proxy server, thereby achieving the access and control of the target device through the client. Moreover, due to the mobility of the client, the client does not need to be used in an isolated region but be universally used in multiple regions to achieve a better access effect. Addresses of all servers are pre-stored in the client. FIG. 8 is a timing diagram illustrating connections of a client in a device cross-region access system according to embodiment seven of the present application.

In C1: after the client starts, the client acquires location information and queries the home according to the BeiDou system or GPS information or according to an IP address of the client itself, and selects the nearest cross-region proxy server to connect according to the home. Alternatively, the client manually switches to the selected proxy server to connect and achieves the connection to the cross-region proxy server to which the target device is connected.

In C2: the client acquires the unique identification information of the target device by the account system of the server or scanning the two-dimensional code of the target device and transmits device addition information to the cross-region proxy server, where the device addition information includes the unique identification information of the device.

In C3: after receiving the device addition information transmitted by the client, the cross-region proxy server queries in the database whether the device is successfully connected to the server to keep alive. If the target device and the cross-region proxy server are successfully kept alive, the cross-region proxy server responds to the client that the target device is successfully added.

In C4: the client achieves the connection to the target device by the cross-region proxy server.

In the connection network between the client and the target device, the connection between the client and the target device through the target server in the target region is switched to the connection through the cross-region proxy server in the proxy region where the client and the target device are both located so that the network messages do not need to pass through the target region but only communicate within the proxy region, shortening the message transmission link and delay, and greatly improving the demonstration effect. In the embodiments of the present application, the device cross-region access system enables the client and the target device are each connected to the cross-region proxy server according to a scheduling method, forming a network access link where the client, the target device, and the server are all in the same or similar region, avoiding the issue of slow access and low success rate when the client and the target device are both in the proxy region but the access is through the target region. In practical applications, the entire process has no human intervention and no impact on the software function of the device, and cannot be perceived by the tested customer, ensuring both the accuracy and reliability of the test results.

Embodiment Eight

Figure 9:
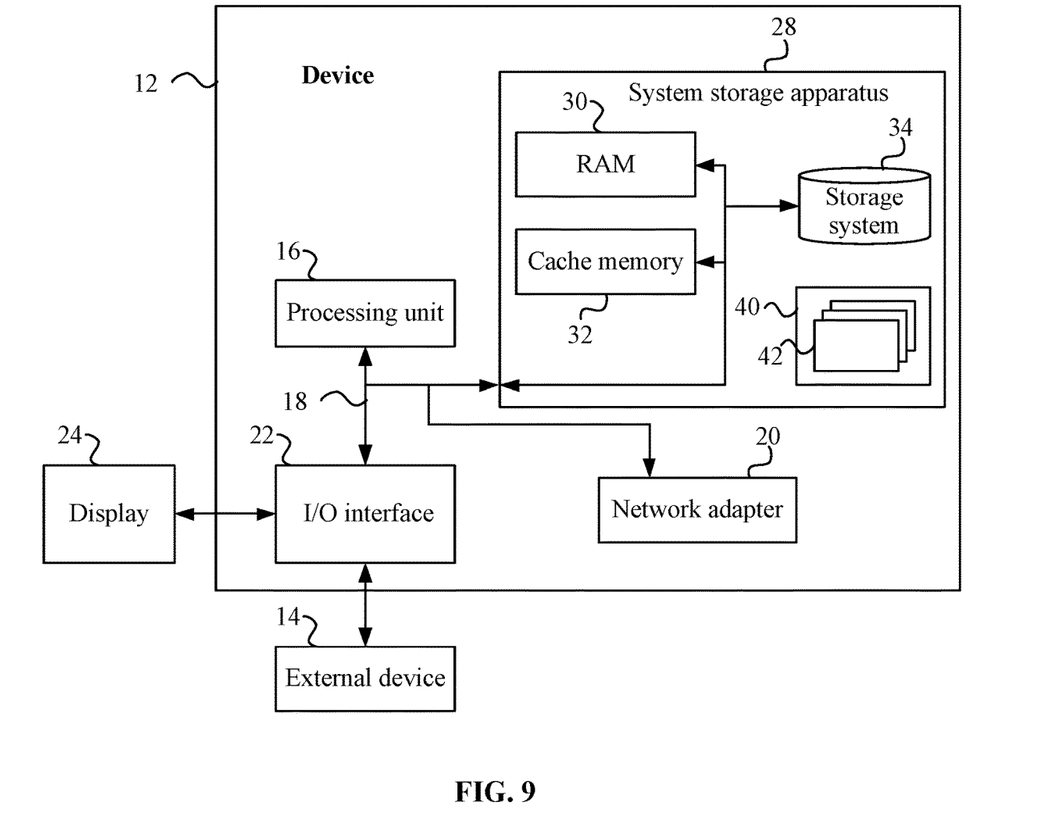
FIG. 9 is a structure diagram of an electronic device according to embodiment eight of the present application.

FIG. 9 is a structural diagram of an electronic device according to an embodiment of the present application. FIG. 9 shows a block diagram of an electronic device 12 for implementing embodiments of the present application. The electronic device 12 shown in FIG. 9 is merely an example and is not intended to limit the function and use scope of the embodiments of the present application.

As shown in FIG. 9, the electronic device 12 is in the form of a general-purpose computer device. Components of the electronic device 12 may include, and are not limited to, one or more processors or processing units 16, a system storage apparatus 28, and a bus 18 connecting different system components (including the system storage apparatus 28 and the one or more processing units 16).

The bus 18 represents one or more of several types of bus structures including a storage apparatus bus or a storage apparatus controller, a peripheral bus, a graphics acceleration port, a processor, or a local bus using any one of multiple bus structures. For example, these architectures include, but are not limited to, an Industry Standard Architecture (ISA) bus, a Micro Channel architecture (MAC) bus, an enhanced ISA bus, a Video Electronics Standards Association (VESA) local bus and a Peripheral Component Interconnect (PCI) bus.

The electronic device 12 includes multiple computer system readable media. These media may be available media that can be accessed by the electronic device 12. These media include volatile and non-volatile media, and removable and non-removable media.

The system storage apparatus 28 may include a computer system-readable medium in the form of a volatile storage apparatus, such as a random-access memory (RAM) 30 and/or a cache memory 32. The electronic device 12 may further include other removable/non-removable, volatile/non-volatile computer system storage media. Just for example, a storage system 34 may be configured to perform reading and writing on a non-removable and non-volatile magnetic medium (not shown in FIG. 9 and usually referred to as a "hard disk driver"). Although not shown in FIG. 9, the storage system 34 may provide a magnetic disk drive for reading from or writing to a removable non-volatile magnetic disk (for example, a "floppy disk"), and an optical disc drive for reading from or writing to a removable non-volatile optical disc (for example, a portable compact disc read-only memory (CD-ROM), a digital video disc read-only memory (DVD-ROM) or other optical media). In these cases, each driver may be connected to the bus 18 by one or more data media interfaces. The storage apparatus 28 may include at least one program product having a group of program modules (for example, at least one program module). Such program modules are configured to perform functions of multiple embodiments of the present application.

A program/utility 40 having a group of program modules 42 (at least one program module 42) may be stored, for example, in the storage apparatus 28. Such program modules 42 include, but are not limited to, an operating system, one or more application programs, other program modules and program data. Each or some combination of these examples may include implementation of a network environment. The program modules 42 generally execute the functions and/or methods in the embodiments of the present application.

The electronic device 12 may communicate with one or more external devices 14 (for example, a keyboard, a pointing terminal, a displayer 24). The device 12 may communicate with one or more terminals that enable a user to interact with the device 12, and/or with any device (for example, a network card or a modem) that enables the device 12 to communicate with one or more other computing devices. Such communication may be performed through an input/output (I/O) interface 22. The electronic device 12 may also communicate with one or more networks (for example, a local zone network (LAN), a wide zone network (WAN), and/or a public network, such as the Internet) through a network adapter 20. As shown in FIG. 9, the network adapter 20 communicates with other modules of the electronic device 12 via the bus 18. It is to be understood that though not shown in FIG. 9, other hardware and/or software modules may be used in conjunction with the electronic device 12. The other hardware and/or software modules include, but are not limited to, microcode, a device driver, a redundant processing unit, an external disk drive array, a redundant arrays of independent disks (RAID) system, a tape driver, or a data backup storage system.

The one or more processing units 16 execute a program stored in the system storage apparatus 28 to perform various functional applications and data processing, for example, to perform one of the following methods provided in embodiments of the present application.

A device cross-region access method is provided, where the method is executed by a target server and includes the steps below. A cross-region access request is received from a target device and IP address information in the cross-region access request is determined. Information of a cross-region proxy server matching the target device is determined according to the IP address information. The cross-region proxy server is preset in a proxy region different from a target region where the target server is located, and the cross-region proxy server and the target server are in a distributed deployment. The information of the cross-region proxy server is transmitted to the target device to enable the target device to establish a connection to the cross-region proxy server.

A device cross-region access method is provided, where the method is executed by a cross-region proxy server and includes the steps below. Identification information of a to-be-accessed target device transmitted by a target server is received. The cross-region proxy server is preset in a proxy region different from a target region where the target server is located, and the cross-region proxy server and the target server are in a distributed deployment. A connection between the target device and the cross-region proxy server is established in response to an access request transmitted by the target device and according to the identification information of the target device. The access request is determined by the target device according to information of the cross-region proxy server transmitted by the target server.

A device cross-region access method is provided, where the method is executed by a target device and includes the steps below. A cross-region access request is transmitted to a matching target server, and information of a cross-region proxy server returned by the target server is received. The information of the cross-region proxy server is determined by the target server according to IP address information in the cross-region access request, the cross-region proxy server is preset in a proxy region different from a target region where the target server is located, and the cross-region proxy server and the target server are in a distributed deployment. An access request is transmitted to the cross-region proxy server according to the information of the cross-region proxy server to establish a connection to the cross-region proxy server.

Embodiment Nine

Embodiment nine of the present application further provides a computer-readable storage medium storing a computer program, where the computer program, when executed by a processor, performs one of the following methods provided in the embodiments of the present application.

A device cross-region access method is provided, where the method is executed by a target server and includes the steps below. A cross-region access request is received from a target device and IP address information in the cross-region access request is determined. Information of a cross-region proxy server matching the target device is determined according to the IP address information. The cross-region proxy server is preset in a proxy region different from a target region where the target server is located, and the cross-region proxy server and the target server are in a distributed deployment. The information of the cross-region proxy server is transmitted to the target device to enable the target device to establish a connection to the cross-region proxy server.

A device cross-region access method is provided, where the method is executed by a cross-region proxy server and includes the steps below. Identification information of a to-be-accessed target device transmitted by a target server is received. The cross-region proxy server is preset in a proxy region different from a target region where the target server is located, and the cross-region proxy server and the target server are in a distributed deployment. A connection between the target device and the cross-region proxy server is established in response to an access request transmitted by the target device and according to the identification information of the target device. The access request is determined by the target device according to information of the cross-region proxy server transmitted by the target server.

A device cross-region access method is provided, where the method is executed by a target device and includes the steps below. A cross-region access request is transmitted to a matching target server, and information of a cross-region proxy server returned by the target server is received. The information of the cross-region proxy server is determined by the target server according to IP address information in the cross-region access request, the cross-region proxy server is preset in a proxy region different from a target region where the target server is located, and the cross-region proxy server and the target server are in a distributed deployment. An access request is transmitted to the cross-region proxy server according to the information of the cross-region proxy server to establish a connection to the cross-region proxy server.

A computer storage medium in the embodiments of the present application may adopt any combination of one or more computer-readable media. The computer-readable medium may be a computer-readable signal medium or a computer-readable storage medium. The computer-readable storage medium may be, but is not limited to, an electrical, magnetic, optical, electromagnetic, infrared or semiconductor system, apparatus or device, or any combination thereof. One example (a non-exhaustive list) of the computer-readable storage medium includes an electrical connection having one or more wires, a portable computer magnetic disk, a hard disk, an RAM, a read-only memory (ROM), an erasable programmable read-only memory (EPROM) or a flash memory, an optical fiber, a portable CD-ROM, an optical storage device, a magnetic storage device, or a suitable combination thereof. In this document, the computer-readable storage medium may be any tangible medium including or storing a program. The program may be used by or used in conjunction with an instruction execution system, apparatus or device.

A computer-readable signal medium may include a data signal propagated in a baseband or as part of a carrier. Computer-readable program codes are carried in the data signal. The data signal propagated in this manner may be in multiple forms and includes, but is not limited to, an electromagnetic signal, an optical signal, or any suitable combination thereof. The computer-readable signal medium may also be any computer-readable medium except the computer-readable storage medium. The computer-readable medium may send, propagate or transmit a program used by or used in conjunction with an instruction execution system, apparatus or device.

The program codes contained on the computer-readable medium may be transmitted on any suitable medium, including, but not limited to, the wireless, a wire, an optical cable, a radio frequency (RF), or any suitable combination thereof.

Computer program codes for performing the operations of the present application may be written in one or more programming languages or a combination thereof, the programming languages including object-oriented programming languages such as Java, Smalltalk and C++ and further including conventional procedural programming languages such as C programming language or similar programming languages. Program codes may be executed entirely on a user computer, executed partly on a user computer, executed as a stand-alone software package, executed partly on a user computer and partly on a remote computer, or executed entirely on a remote computer or a server. In the scenario involving the remote computer, the remote computer may be connected to the user computer through any type of network, including a local zone network (LAN) or a wide zone network (WAN), or the connection may be made to an external computer, for example, through the Internet using an Internet service provider.

What is claimed is:

1. A device cross-region access method, executed by a target server and comprising:
   receiving a cross-region access request from a target device and determining Internet protocol (IP) address information in the cross-region access request;
   determining information of a cross-region proxy server matching the target device according to the IP address information, wherein the cross-region proxy server is preset in a proxy region different from a target region where the target server is located, and the cross-region proxy server and the target server are in a distributed deployment; and
   transmitting the information of the cross-region proxy server to the target device to enable the target device to establish a connection to the cross-region proxy server.

2. The method of claim 1, wherein determining the information of the cross-region proxy server matching the target device according to the IP address information comprises:
   determining a home of the target device according to the IP address information; and determining the cross-region proxy server matching the target device from candidate proxy servers according to a distance between the home of the target device and a setting region of each of the candidate proxy servers.

3. The method of claim 1, wherein the cross-region access request further comprises identification information of the target device; and
wherein after determining the information of the cross-region proxy server matching the target device according to the IP address information, the method further comprises:
transmitting the identification information of the target device to the cross-region proxy server to enable the cross-region proxy server to establish the connection to the target device according to the identification information of the target device.

4. The method of claim 1, wherein the cross-region access request further comprises at least one of a cross-region access duration threshold of the target device or a cross-region access number threshold of the target device; and
wherein after determining the information of the cross-region proxy server matching the target device according to the IP address information, the method further comprises:
transmitting the at least one of the cross-region access duration threshold of the target device or the cross-region access number threshold of the target device to the cross-region proxy server to enable the cross-region proxy server to control a cross-region access of the target device according to the at least one of the cross-region access duration threshold of the target device or the cross-region access number threshold of the target device.

5. The method of claim 1, further comprising:
receiving and storing a connection record transmitted by the cross-region proxy server after the cross-region proxy server completes the connection to the target device; and
wherein after receiving the cross-region access request from the target device, the method further comprises:
querying the connection record, and controlling a cross-region access of the target device according to a query result of the connection record.

6. A device cross-region access method, executed by a cross-region proxy server and comprising:
receiving identification information of a to-be-accessed target device transmitted by a target server, wherein the cross-region proxy server is preset in a proxy region different from a target region where the target server is located, and the cross-region proxy server and the target server are in a distributed deployment; and
establishing, in response to an access request transmitted by the target device and according to the identification information of the target device, a connection between the target device and the cross-region proxy server, wherein the access request is determined by the target device according to information of the cross-region proxy server transmitted by the target server.

7. The method of claim 6, further comprising:
receiving a target device access request transmitted by a client that establishes a connection to the target device, wherein the target device access request comprises the identification information of the target device; and
querying a connection result between the target device and the cross-region proxy server according to the identification information of the target device, and transmitting the connection result to the client to enable the client to access the target device according to the connection result.

8. An electronic device, comprising:
at least one processor; and
a storage apparatus configured to store at least one program,
wherein the at least one program, when executed by the at least one processor, causes the at least one processor to perform at least:
receiving a cross-region access request from a target device and determining Internet protocol (IP) address information in the cross-region access request;
determining information of a cross-region proxy server matching the target device according to the IP address information, wherein the cross-region proxy server is preset in a proxy region different from a target region where the target server is located, and the cross-region proxy server and the target server are in a distributed deployment; and
transmitting the information of the cross-region proxy server to the target device to enable the target device to establish a connection to the cross-region proxy server.

9. A non-transitory computer-readable storage medium storing a computer program, wherein the computer program, when executed by a processor, performs the device cross-region access method of claim 1.

10. The electronic device of claim 8, wherein the at least one program, when executed by the at least one processor, causes the at least one processor to perform determining the information of the cross-region proxy server matching the target device according to the IP address information in the following way:
determining a home of the target device according to the IP address information; and
determining the cross-region proxy server matching the target device from candidate proxy servers according to a distance between the home of the target device and a setting region of each of the candidate proxy servers.

11. The electronic device of claim 8, wherein the cross-region access request further comprises identification information of the target device; and
wherein the at least one program, when executed by the at least one processor, causes the at least one processor to, after determining the information of the cross-region proxy server matching the target device according to the IP address information, further perform:
transmitting the identification information of the target device to the cross-region proxy server to enable the cross-region proxy server to establish the connection to the target device according to the identification information of the target device.

12. The electronic device of claim 8, wherein the cross-region access request further comprises at least one of a cross-region access duration threshold of the target device or a cross-region access number threshold of the target device; and
wherein the at least one program, when executed by the at least one processor, causes the at least one processor to, after determining the information of the cross-region proxy server matching the target device according to the IP address information, further perform:
transmitting the at least one of the cross-region access duration threshold of the target device or the cross-region access number threshold of the target device to the cross-region proxy server to enable the cross-region proxy server to control a cross-region access of the target device according to the at least one of the cross-region access duration threshold of the target device or the cross-region access number threshold of the target device.

13. The electronic device of claim 8, wherein the at least one program, when executed by the at least one processor, causes the at least one processor to further perform:

receiving and storing a connection record transmitted by the cross-region proxy server after the cross-region proxy server completes the connection to the target device; and wherein the at least one program, when executed by the at least one processor, causes the at least one processor to, after receiving the cross-region access request from the target device, further perform:

querying the connection record, and controlling a cross-region access of the target device according to a query result of the connection record.

14. An electronic device, comprising:

at least one processor; and a storage apparatus configured to store at least one program, wherein the at least one program, when executed by the at least one processor, causes the at least one processor to perform the device cross-region access method of claim 6.

15. A non-transitory computer-readable storage medium storing a computer program, wherein the computer program, when executed by a processor, performs the device cross-region access method of claim 6.

16. A non-transitory computer-readable storage medium storing a computer program, wherein the computer program, when executed by a processor, performs the device cross-region access method of claim 4.

* * * * *